United States Patent [19]

Kelk

[11] Patent Number: 5,487,669

[45] Date of Patent: Jan. 30, 1996

[54] MOBILITY AID FOR BLIND PERSONS

[76] Inventor: George F. Kelk, 11 Pine Forest Road, Toronto, Ontario, Canada, M4N 3E6

[21] Appl. No.: 87,342

[22] Filed: Jul. 7, 1993

Related U.S. Application Data

[63] Continuation-in-part of Ser. No. 28,218, Mar. 9, 1993, abandoned.

[51] Int. Cl.$^6$ ................................................. A61H 3/00
[52] U.S. Cl. ........................................................ 434/112
[58] Field of Search ........................... 434/112; 367/116; 381/51; 356/1; 340/407; 250/215, 221

[56] References Cited

U.S. PATENT DOCUMENTS

| | | | |
|---|---|---|---|
| 3,198,952 | 8/1965 | Benham et al. | 356/1 |
| 3,530,468 | 9/1970 | Hannan | 356/1 |
| 3,546,467 | 12/1970 | Benjamin et al. | 250/215 |
| 3,654,477 | 4/1972 | Benjamin, Jr. | 250/221 X |
| 4,280,204 | 7/1981 | Elchinger | 367/116 |
| 4,660,022 | 4/1987 | Osaka | 340/407 |
| 4,712,003 | 12/1987 | Ban et al. | 250/221 |
| 5,097,856 | 3/1992 | Chi-Sheng | 381/51 X |

Primary Examiner—Stephen R. Crow
Assistant Examiner—Glenn E. Richman

[57] ABSTRACT

The present invention provides a mobility aid, for example a mobility aid handled in the manner of a flashlight, which allows a totally blind person to hand-scan, such as back and forth or up and down, the surrounding scene in order to hear the unbroken tonal phrases of varying frequencies which continuously indicate to the user the distance to, and, from the position of the hand, the position of objects and surfaces which make up the user's surroundings. A narrow laser beam is used, resulting in much higher angular resolution and distance detail, due to the much shorter wavelength, than that obtainable from practical ultrasonic devices, including those of the said prior art.

8 Claims, 6 Drawing Sheets

MOBILITY AID FOR BLIND PERSONS

CROSS-REFERENCE TO RELATED APPLICATION

This application is a continuation-in-part of my application Ser. No. 08/028218 filed on Mar. 9, 1993 and entitled "MOBILITY AID FOR BLIND PERSONS", now abandoned.

FIELD OF THE INVENTION

This invention relates to a mobility aid which provides the user with information, in the form of audible tones, of the location of objects in the surrounding environment.

BACKGROUND OF THE INVENTION

A variety of mobility aids have been developed to provide the visually impaired with a means of travelling independently, confidently and quickly. The most commonly used mobility aid is the white cane. The white cane is an inexpensive and effective device for providing the user with information on some of the environment within the range of the cane. Some of the disadvantages of the white cane are that obstacles located above ground level are not easily detectable and obstacles located outside of the range of the cane are undetectable.

Recently developed mobility aids have taken advantage of advances in microelectronics to address the drawbacks associated with the white cane. One such mobility aid, known as the "laser cane", consists of a white cane incorporating three lasers, each directed in a different direction in the vertical plane. The three laser beams are referred to as the upper beam, the straight ahead beam and the lower beam. When an object is located at a specific distance in the beam's path, some of the reflected beam is received by an optical receiver positioned at a fixed distance from the laser on the cane. When a reflected laser beam is detected by the receiver, an audible tone is produced. There are separate receivers for the upper and straight ahead beams and each causes a different audible tone to be produced when a beam is detected. The lower beam operates differently from the upper and straight ahead beams since the lower beam is continually reflected by the ground to its own receiving unit on the cane. Thus when a drop off is encountered the receiving unit will not detect a reflected beam and it will cause an audible tone to be produced, distinct from the tones associated with the upper and straight ahead beams. A distinctly different tone is produced for each beam and by interpreting the tones the user can determine the position of the object. In addition, the user has the option of also utilizing a vibrating unit on the cane which provides tactile information to the user when an object is detected by the straight-ahead beam. One drawback with this device is that its use of a fixed triangulation method only permits the detection of objects at specific distances, one for each laser, from the user.

In yet another prior art device, the "BRYTECH* Sensory 6", ultrasonic waves are used to detect the presence of an object in the vicinity of the user. The device emits ultrasonic waves and by detecting the reflected waves determines the proximity of the object to the user. Periodic tone pulses, about two per second, are produced, the frequency of each pulse representing the average distance from the user of the area from which the waves are reflected. A near scene will cause a high-pitched tone and a distant scene will cause a low-pitched tone. These tones are provided to the user in earphones. A limitation of this device is that the ultrasonic waves emitted by the device have a wide pattern, and consequently it is difficult for the user to determine

* BRYTECH - trade mark the position of an object in the detection pattern. A further limitation of the device is that confusion can arise due to the inability of the device to distinguish between objects at different distances which are in the field of view at the same time.

In yet another prior art device, the "MOWAT* Sensor," an ultrasonic beam is emitted having a detection pattern approximating the size of a typical person. If an object is present within the pattern, the reflected wave is received by the device and the hand held sensor is caused to vibrate. The closer the object to the user, the higher the vibration rate of the sensor. If two or more objects are located within the beam, the device will respond in a manner dependent on the relative sizes of the objects. The sensor has a short and a long range setting. On the short range setting, the device will only respond to objects within a short distance of the device, whereas in the long range setting the device will respond to objects at a greater distance. One of the drawbacks of this device is that the large size of the detection pattern does not enable the user to locate objects accurately. Another drawback of the device is that it does not readily enable the user to interpret the panorama of the surrounding environment or objects located therein.

THE INVENTION

The present invention provides a mobility aid, for example a mobility aid handled in the manner of a flashlight, which allows a totally blind person to hand-scan, such as back and forth or up and down, the surrounding scene in order to hear the unbroken tonal phrases of varying frequencies which continuously indicate to the user the distance to, and, from the

* MOWAT - trade mark position of the hand, the position of objects and surfaces which make up the user's surroundings. A narrow beam is used, resulting in much higher angular resolution and distance detail, due to the much shorter wavelength, than that obtainable from practical ultrasonic devices, including those of the said prior art.

SHORT DESCRIPTION OF THE DRAWINGS

Three embodiments of the invention will now be described, by way of example, with reference to the accompanying drawings, in which.

DESCRIPTION OF THE FIRST PREFERRED EMBODIMENT

Figure 1:
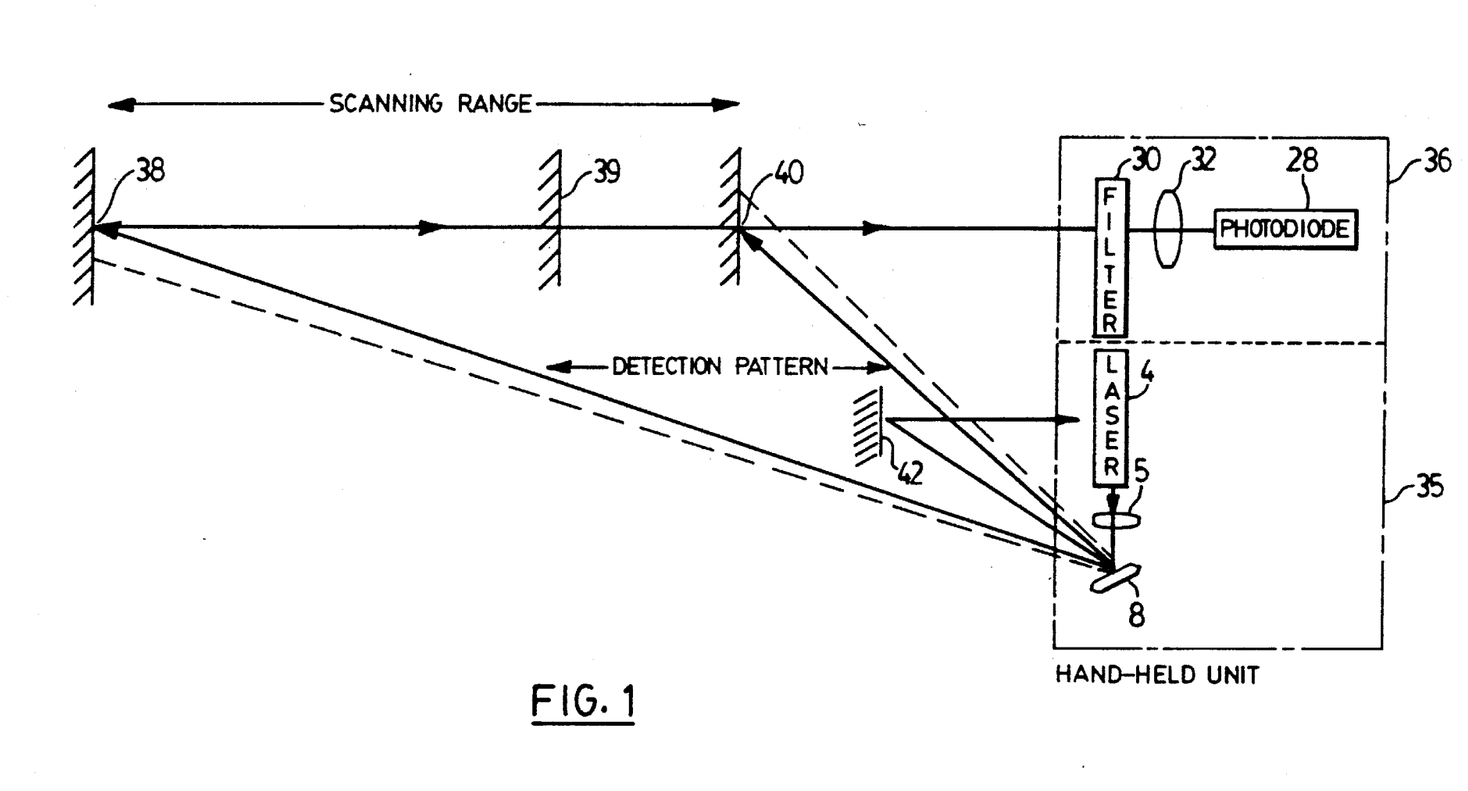
FIG. 1 is a schematic diagram of the optical arrangement of the first preferred embodiment described in more detail in FIG. 6.
Figures 2, 3, 4:
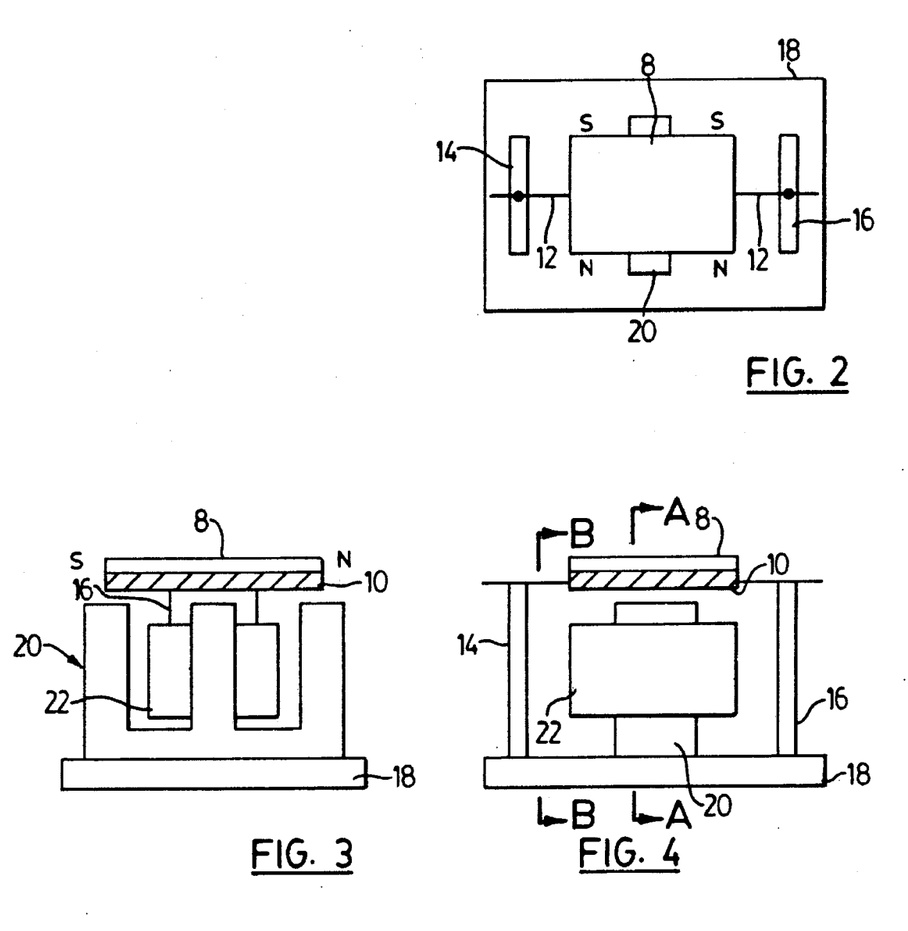
FIG. 2 is a top view of the mirror/magnet assembly, the mirror of which is shown in FIG. 1.
FIG. 3 is a sectional view of the mirror/magnet assembly taken on line A—A in FIG. 4.
FIG. 4 is a side view of the mirror/magnet assembly.
Figure 5:
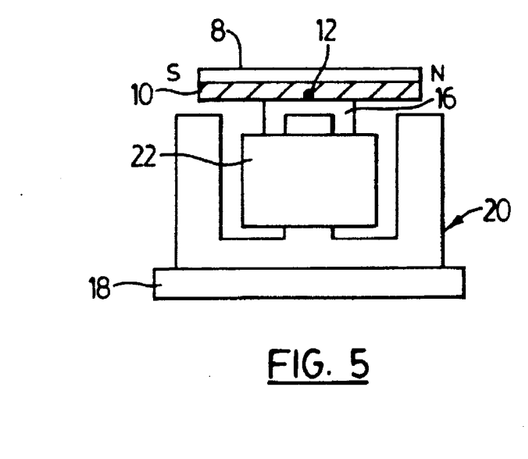
FIG. 5 is a sectional view of the mirror/magnet assembly taken on line B—B in FIG. 4.

FIG. 1 illustrates the optical arrangement of a hand-held mobility aid containing a transmitting section 35 and a light receiver section 36. The transmitting section 35 consists of a laser diode 4, the output of which is focused by a lens 5 into a parallel beam which is then reflected by an oscillating mirror 8, which is part of the mirror/magnet assembly, to produce a fan-shaped beam of laser light.

The light receiver section 36 consists of a filter 30, the output of which excludes all wavelengths except those near that of the laser diode, feeding a lens 32 which focuses the light, which comes from the spot produced on an object by the laser, onto a photodiode 28. The light receiver section has a narrow cone of sensitivity, preferably about one degree of solid angle, coplanar with and intersecting the fan-shaped laser beam. At the hand-held unit the transmitted and the received light paths are approximately four inches apart.

The distance to an object illuminated by the laser beam, such as the object 38, 39 or 40, is determined by a triangulation process, completed by electronic units to be described, in which the time of receipt of each group of pulses of laser light in relation to the mirror position at that moment is interpreted as the distance to the object.

Referring to FIGS. 2 to 5, a mirror 8 is bonded to the surface of a permanent magnet 10. Thin short wires 12, which in the present embodiment are 0.004 inches in diameter, are welded to each end of the permanent magnet 10 and their outer ends are welded to the top of two supports 14 and 16 which are fastened to base 18. The axes of the wires 12 are collinear with the centre of gravity of the combined mirror and magnet. The tension on the wires 12 and their torsional stiffness permits the mirror and magnet to oscillate in torsion at the desired resonant frequency, which in the present embodiment is 300 Hz., thus enabling sweeps of the laser beam 600 times per second. A laminated-core electromagnet 20 is fixed to the base 18 and positioned in relation to the permanent magnet 10 so that through magnetic coupling the electromagnet can cause oscillation of the mirror and magnet.

Figure 6:
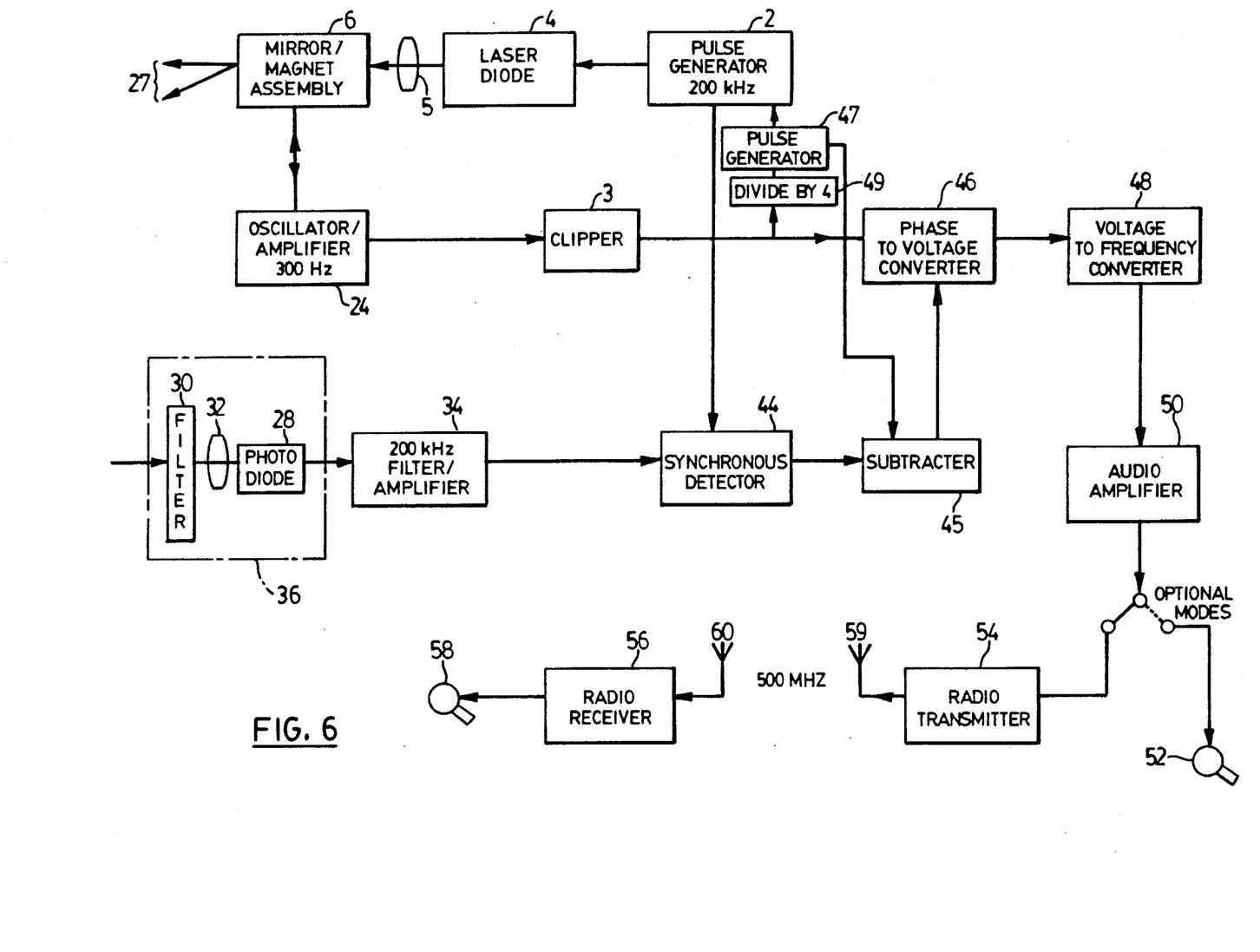
FIG. 6 is a schematic block diagram of the first preferred embodiment, the optical arrangement of which is shown in FIG. 1.

Referring to FIG. 6, a sinusoidal voltage is generated by an oscillator in which the frequency-determining element is the combination of mirror and magnet, driven at resonance, and the activating source is an oscillator/amplifier 24. The sine wave voltage output from the amplifier/oscillator 24, suitably adjusted in phase, is fed to a clipper 3 which flattens the peaks of the sine wave, in the present example by 10% of their amplitude. The purpose of this clipping is to cause only the more linear portions of the sine wave to be used for distance sensing. The output of the clipper 3 is fed both to a divider-by-four 49 and to a phase-to-voltage converter 46.

The laser diode 4 is driven by a pulse generator 2, the output of which is a pulse train which in the present embodiment has a frequency of 200 kHz. The laser light, as seen by the light receiver 36, accordingly has a carrier frequency of 200 kHz. The output of the light receiver is fed to an amplifier 34 which passes only a narrow band at 200 kHz. in order to remove noise of other frequencies from the signal. The output of the amplifier 34 is fed to a synchronous detector 44, which generates a signal voltage proportional to the amplitude of only that part of its input which is in synchronism with the reference pulses received from the pulse generator 2.

The output of the synchronous detector 44 is fed to a subtracter 45, which outputs its input less an amount equal to the output of the synchronous detector 44 which remains when the laser is periodically switched off, thereby further improving the signal-to-noise ratio.

The switching off and on of the laser is determined by the divider-by-four 49 and the pulse generator 47, which together cause momentary pauses in the laser output 75 times per second. These pauses, in the present example, are five carrier pulses long.

The phase-to-voltage converter 46 generates a voltage proportional to the distance of the laser spot, reflected from an object, from the hand-held unit. This is done by sampling the amplitude, measured from one of its extremes, of the clipped sine wave from clipper 3, which represents the mirror position and hence the beam angle at the time of occurrence of the signal pulses from subtracter 45. Each of these samples therefore represents a distance, and the samples are then averaged, using a time constant short enough to preserve sufficient distance detail as a result of hand-scanning.

The amplitude of the output voltage of the phase-to-voltage converter 46, during the hand-scan performed by the user, represents the distance, fixed or varying, to the laser spot on the various objects illuminated. To convey this information to the user, this signal voltage is converted to a proportional audio tone by a voltage-to-frequency converter 48, which produces in the present embodiment a continuous frequency range of from 200 Hz. at the longest distance detected, to 3000 Hz. at the shortest distance detected. If users prefer, the voltage-to-frequency converter 48 can be arranged to produce a greater amplitude of the higher tones representing nearby objects than the amplitude of the lower tones representing more distance objects.

The output of the voltage-to-frequency converter 48 is amplified by an audio amplifier 50.

These tonal phrases not only convey information to the user as to the distance of objects in the scanning range of the unit, but also relate this information to the panorama of the surrounding environment when the user scans the surrounding environment by physically moving the handheld unit. In this way the user can form, very quickly, a mental picture of many aspects of the surrounding environment.

In the present preferred embodiment, the audio signals, or tonal phrases, generated by the audio amplifier 50 are provided to the user of the unit in one of two ways. First, the output of the audio amplifier can be connected through a wire directly to an earphone 52. In the alternative, the output of the audio amplifier 50 can be connected to a radio transmitter 54 which modulates the audio signal, in the present embodiment at a frequency of 500 MHz, to generate a modulated radio signal. The radio signal is then transmitted to a radio receiver 56 which demodulates the radio signal and provides it to a user through an earphone 58. Earphones 52 and 58 are preferably similar to conventional deaf-aid units but shaped so as not to block the ear canal, since hearing the normal ambient sounds is important to the visually impaired.

DESCRIPTION OF THE SECOND PREFERRED EMBODIMENT

Figure 7:
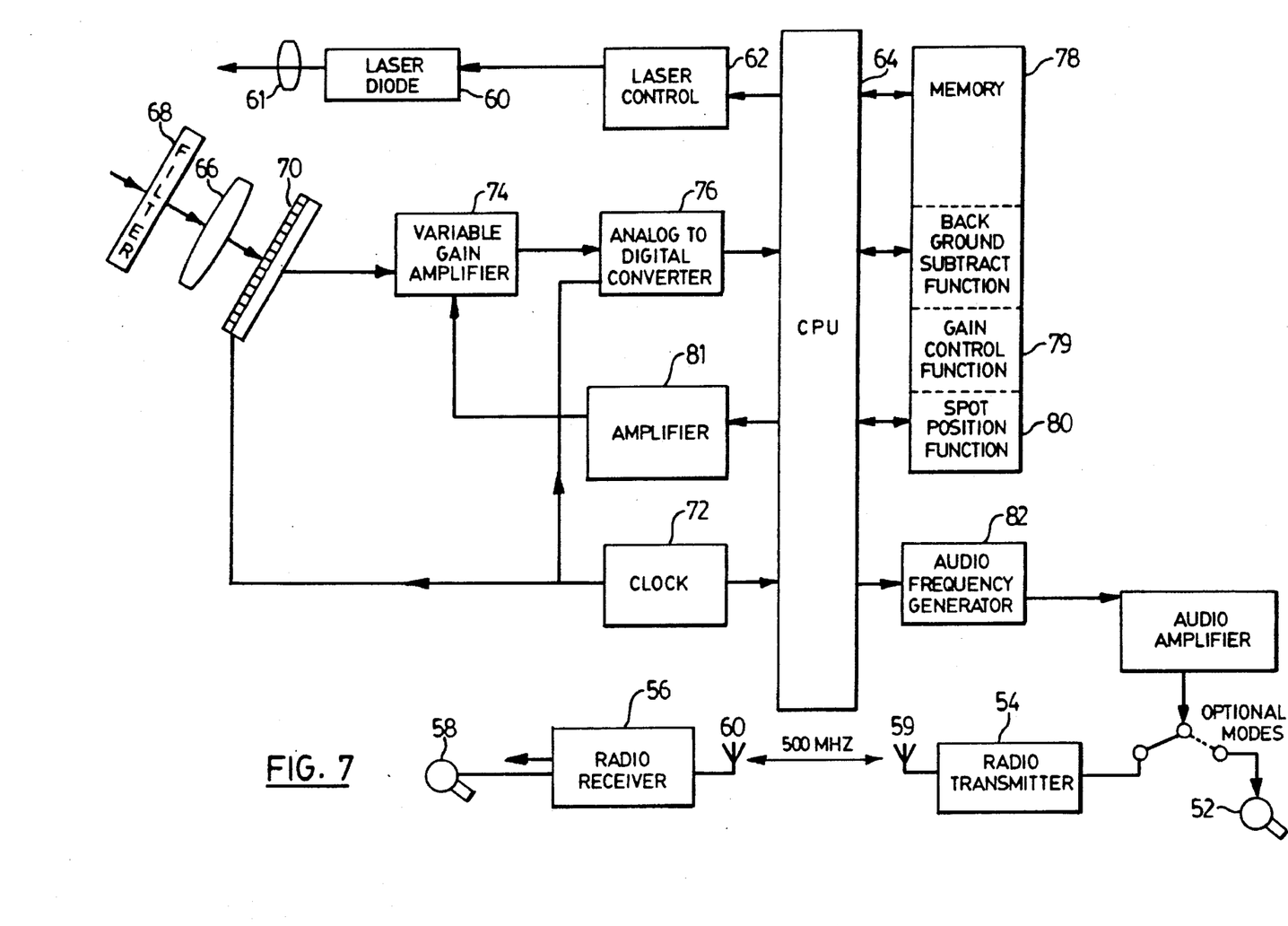
FIG. 7 is a schematic block diagram of the second preferred embodiment, the optical arrangement of which is shown in FIG. 8.

FIG. 7 is a schematic block diagram of the second preferred embodiment. In this embodiment, a laser diode 60 is repetitively stimulated at a constant intensity by a laser control 62 and through lens 61 generates a narrow beam. The laser control 62 is controlled by a central processing unit (CPU) 64.

Figure 8:
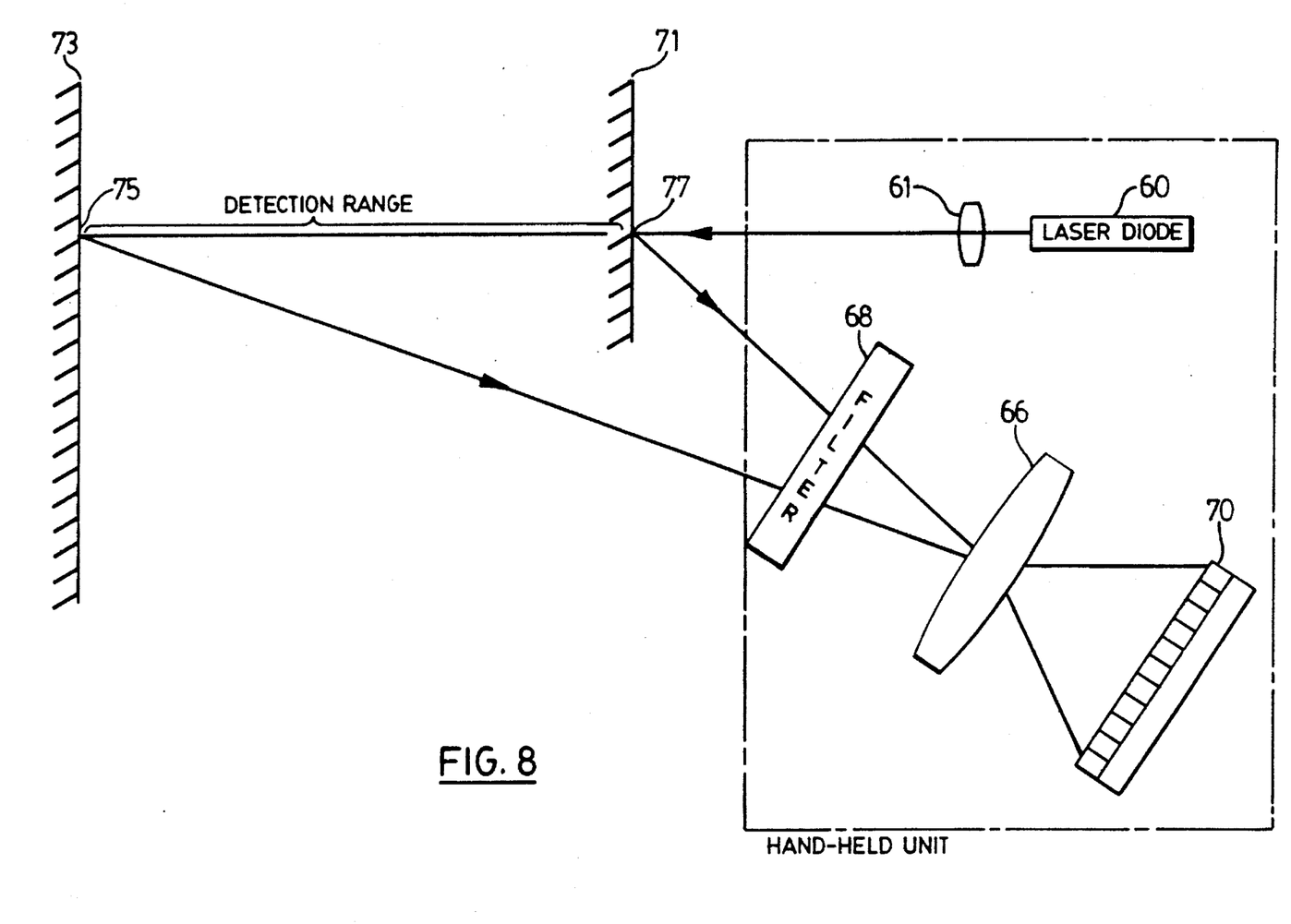
FIG. 8 is a schematic diagram of the optical arrangement of the second preferred embodiment.

The present embodiment and the first preferred embodiment both use a scanning triangulation method for determining the relative position of objects in the detection range of the unit. Referring to FIG. 8, the detection range of the unit is located along the path of the laser beam generated by the laser diode 60. The detection range is a zone along the length of the laser beam defined by a minimum position 77 and a maximum position 75. The receiving portion of the unit consists of a lens 66, a filter 68 and a charge coupled device (CCD) 70. The filter 68 has a wavelength pass band centered on the wavelength of the laser beam generated by the laser diode 60. The CCD 70 consists of a linear array of photodiodes. Each photodiode in the CCD 70 senses a different reflecting point located in the detection range. The number of photodiodes in the CCD 70 determines the distance resolution of the mobility aid. When the laser beam is reflected from an object located within the detection range of the unit, for example at points 75 and 77, such that some of the reflected light travels through the filter 68 and the lens 66 and is detected by the CCD 70, the relative position of the object in the detection range is determined. The limits of the detection range are determined by the optical geometry, the characteristics of the lens 66 and the length and placement of the CCD 70. By determining which of the photodiodes is receiving the laser light the relative position of the object in the detection range is determined.

Referring again to FIG. 7, a clock 72 is used to interrogate each photodiode in turn. When a photodiode receives reflected laser light, a photocurrent is produced and provided to a variable gain amplifier 74. The gain of the variable gain amplifier 74 is controlled by the CPU 64 which utilizes a program in memory for performing a gain control function 79. The CPU 64, through an amplifier 81, adjusts the gain of the variable gain amplifier 74 in order to amplify the photocurrent signal to a level suitable for manipulation by an analog-to-digital converter 76. The signal bits are provided by the analog-to-digital converter 76 to the data bus of CPU 64 on successive clock pulses of the clock 72. The signal bits are stored by the CPU 64 in a memory 78. The clock 72 also provides the timing for the CPU 64.

A further function performed by the CPU 64 is the background subtract function 85. The background subtract function is implemented by the CPU 64 using a program stored in memory 78. During alternate scans of the CCD photocurrents, the laser control 62 switches off the laser diode. The resulting bits representing the photodiode outputs are stored as before. Under control of the CPU, the digital outputs with the laser off are then subtracted from those with the laser on.

The spot position function 80 is performed by the CPU 64 using a program stored in memory 78. The spot position function 80 determines the relative distance of an object in the detection range of the unit by first determining which photodiode, or photodiodes, in the CCD 70 received the reflected laser light. The CPU 64 then uses a look up table, stored in memory 78, to determine the position of the object in the detection range associated with the activated photodiode, or photodiodes. When more than one photodiode senses a particular reflected laser beam, the spot detection function 80 interpolates the amplified photocurrent to determine the centre of the image on the CCD and therefore the most probable centre location of the spot in the detection range. This interpolation process effectively increases the distance resolution of the mobility aid.

The spot detection function 80 causes the CPU 64 to provide a signal to an audio frequency generator 82 corresponding to the position of the object. The audio frequency generator 82 generates a frequency within the range of 200–3000 Hz depending on the position of the object in the detection range as determined by the spot detection function. The spot detection function 80 causes the audio frequency generator 82 to generate a high frequency for objects close to the user and a low frequency for objects far from the user.

The output of the audio amplifier 86 is then provided to the user in one of two ways, both of which have been described above with respect to the first preferred embodiment.

To operate the unit the user manually scans the surrounding environment by hand-scanning the unit. The unit will then generate tonal expressions consisting of continuous tonal phrases composed of tones of varying frequencies. By interpreting these tonal phrases users are able to determine the positions of and distances to objects in their surrounding environment. Both the first and second preferred embodiments can be used to scan vertically, horizontally, or in any other manner the user finds useful.

DESCRIPTION OF THE THIRD PREFERRED EMBODIMENT

Figure 9:
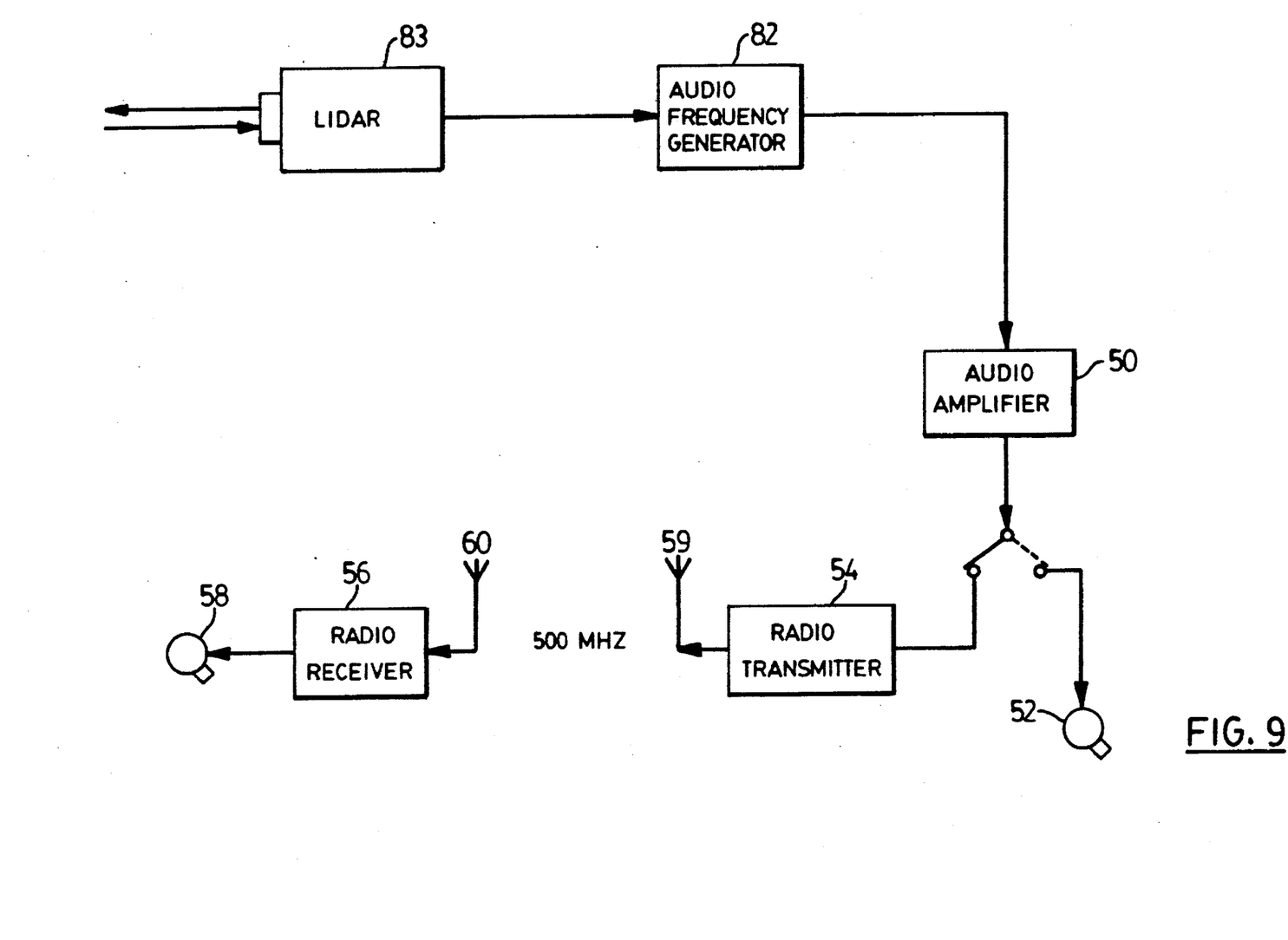
FIG. 9 is a schematic block diagram of the third preferred embodiment.

Referring now to FIG. 9, which illustrates the third embodiment of the invention, the distance sensing means is a lidar. The lidar 83 is compact so as to be conveniently fitted into the hand-held mobility aid, but is otherwise conventional and adapted to operate in the known manner. The lidar senses the distance of an object in terms of the time taken for a short pulse transmitted by it to the travel to the object and to be received back at its source. The lidar 83 feeds an analog or a digital signal to an audio-frequency generator 82, the output frequency of which varies according to the distance of the object from which the light is reflected. The output is amplified by an amplifier and, exactly as described with reference to FIGS. 6 and 7, is transmitted directly to earphone 52, or optionally to earphone 58 via a radio link 54, 56.

While the invention has been described with particular reference to a hand-held mobility aid, the skilled person will appreciate that the scope of invention includes variants not specifically described but which are covered by the appended claims.

I claim:

1. A hand-held mobility aid for determining the positions of objects relative to a user, comprising:

means for transmitting laser radiation at a range of angles so as to scan a predetermined sector at a predetermined rate;

means for receiving said laser radiation reflected from an object;

scanning triangulation means responsive to the reflected radiation for continuously determining the distance of said object from the mobility aid;

means for producing an audible tone corresponding continuously to the distance of said object from the mobility aid; and means for transmitting said audible tone or tones from said producing means to a user, said mobility aid being adapted to fit in the hand of said user allowing said user to hand scan an area wherein said means for transmitting laser radiation comprises:

(a) a laser diode and lens;

(b) a pulse generator operating at a predetermined frequency stimulating said laser diode so as to produce pulses of laser radiation;

(c) an oscillating mirror/magnet assembly receiving said pulses of laser radiation and oscillating at a predetermined resonant frequency such that reflected laser radiation is transmitted; and (d) means for generating a signal at said predetermined resonant frequency for oscillating said oscillating mirror/magnet assembly;

wherein said means for receiving said laser radiation comprises:

(a) a filter admitting radiation at the wavelength of the laser radiation;

(b) a lens for focusing said admitted radiation; and (c) a photodetector for converting said admitted radiation into photocurrent;

and wherein said scanning triangulation means comprises:

(a) a synchronous detector receiving said photocurrent and said pulse generator signal and producing a demodulated signal;

(b) a phase-to-voltage converter sampling said oscillating signal at time intervals determined by said demodulated signal and time averaging said sampled signal; and (c) a voltage-to-frequency converter converting said integrated signal into an audio signal having a frequency proportional to the voltage of said time averaged signal, said means for producing an audible tone comprising an audio amplifier amplifying said audio signal in an audio band.

2. A mobility aid according to claim 1, wherein said means for transmitting said audible tone to said user comprises an earphone connected to said audible tone producing means.

3. A mobility aid according to claim 2, wherein said earphone is shaped to allow unobstructed flow of environmental sounds into the user's ear.

4. A mobility aid according to claim 2, wherein said means for transmitting said audible tone to said user comprises a radio link having a receiver and a transmitter, said receiver being integral with the earphone.

5. A mobility aid according to claim 1, further comprising a means of reducing the noise present in the system by subtracting the effect of radiation received by said receiving means in the absence of laser radiation from the effect of radiation received by said receiving means when the laser is transmitting.

6. A mobility aid according to claim 1 wherein:

said means for transmitting laser radiation comprises:

(a) a laser diode and lens;

(b) a pulse generator operating at a predetermined frequency stimulating said laser diode so as to produce pulses of laser radiation;

(c) an oscillating mirror assembly receiving said pulses of laser radiation and oscillating at a predetermined resonant frequency such that reflected laser radiation is transmitted; and (d) an oscillator for generating a signal at said predetermined resonant frequency for oscillating said oscillating mirror assembly; wherein said means for receiving said laser radiation comprises:

(a) a filter admitting radiation at the wavelength of the laser radiation and travelling in a line perpendicular to said filter;

(b) a lens for focusing said admitted radiation; and (c) a photodetector for converting said admitted radiation into photocurrent;

and wherein said scanning triangulation means comprises:

(a) a synchronous detector receiving said photocurrent and said pulse generator signal and producing a demodulated signal;

(b) a phase-to-voltage converter sampling said oscillating signal at time intervals determined by said demodulated signal and time averaging said sampled signal; and (c) a voltage-to-frequency converter converting said integrated signal into an audio signal having a frequency proportional to the voltage of said time averaged signal, said means for producing an audible tone comprising an audio amplifier amplifying said audio signal in an audio band.

7. A mobility aid according to claim 1, wherein:

said means for transmitting laser radiation comprises:

(a) a laser diode;

(b) a laser control for controlling the emission of said laser diode;

(c) a central processing unit for controlling said laser control;

wherein said means for receiving said laser radiation comprises:

(a) a filter admitting radiation at the wavelength of the laser radiation;

(b) a lens for focusing said admitted radiation travelling within a predetermined sector; and (c) a linear array of photodetectors for receiving said focused radiation and converting said focused radiation into photocurrent;

and wherein said scanning triangulation means comprises:

(a) a clock for successively interrogating each photodetector in said array to determine if laser radiation has been received;

(b) an analog-to-digital converter connected to said clock for converting the photocurrent from said interrogated photodiode into a digital signal;

(c) said digital signal being provided to said central processing unit; and (d) memory associated with said central processing unit storing routines for determining if said interrogated photodetector has detected laser radiation, storing said digital signal and determining the relative position of an object based on the interrogated photodetector;

said means for producing an audible tone comprising an audio generator converting said distance-proportional signals into a range of audio frequencies.

8. A mobility aid according to claim 1, wherein said distance determining means comprises a lidar coupled to said audible tone producing means.

* * * * *